United States Patent
Kelford et al.

(10) Patent No.: US 11,719,160 B2
(45) Date of Patent: Aug. 8, 2023

(54) ACOUSTIC LINER AND METHOD OF FORMING SAME

(71) Applicant: Rohr, Inc., Chula Vista, CA (US)

(72) Inventors: Bryce T. Kelford, San Diego, CA (US); Joseph R. Lemanski, Chula Vista, CA (US)

(73) Assignee: Rohr, Inc., Chula Vista, CA (US)

( * ) Notice: Subject to any disclaimer, the term of this patent is extended or adjusted under 35 U.S.C. 154(b) by 582 days.

(21) Appl. No.: 16/780,168

(22) Filed: Feb. 3, 2020

(65) Prior Publication Data
US 2021/0239049 A1    Aug. 5, 2021

(51) Int. Cl.
*F02C 7/24* (2006.01)
*G10K 11/168* (2006.01)

(52) U.S. Cl.
CPC .............. *F02C 7/24* (2013.01); *G10K 11/168* (2013.01)

(58) Field of Classification Search
CPC . G10K 11/168; F02K 1/827; F05D 2260/963; F23R 2900/00014; B64D 2033/0206; F01N 2310/00; F01N 1/24; F02C 7/24
See application file for complete search history.

(56) References Cited

U.S. PATENT DOCUMENTS

| | | | |
|---|---|---|---|
| 4,723,626 A * | 2/1988 | Carr | B64D 33/02 181/213 |
| 5,151,311 A | 9/1992 | Parente | |
| 9,447,576 B2 | 9/2016 | Liou | |
| 9,704,467 B1 * | 7/2017 | Nampy | F02C 7/24 |
| 2003/0156940 A1 * | 8/2003 | Czachor | F01D 21/045 415/119 |
| 2013/0075193 A1 | 3/2013 | Vavalle | |
| 2014/0072421 A1 * | 3/2014 | Clarkson | F01D 25/24 156/194 |
| 2016/0107746 A1 | 4/2016 | Tiwari | |
| 2019/0210157 A1 * | 7/2019 | Berry | B23K 26/032 |
| 2019/0329360 A1 * | 10/2019 | Reeves | F02C 7/045 |
| 2020/0195953 A1 * | 6/2020 | Lainema | H04N 19/176 |

FOREIGN PATENT DOCUMENTS

WO        9426994 W        11/1994

OTHER PUBLICATIONS

Merriam-Webster dictionary, definition for foil.*
EP search report for EP21154721.1 dated Jun. 28, 2021.

* cited by examiner

*Primary Examiner* — Todd E Manahan
*Assistant Examiner* — Rodolphe Andre Chabreyrie
(74) *Attorney, Agent, or Firm* — Getz Balich LLC

(57) ABSTRACT

An acoustic liner includes a core including a plurality of cells extending between a first side of the core and a second side of the core opposite the first side of the core. The acoustic liner further includes a back skin including a light-reflecting layer. The light-reflecting layer includes a first side attached to the first side of the core. The acoustic liner further includes a face skin. The face skin includes a first side attached to the second side of the core.

16 Claims, 6 Drawing Sheets

ACOUSTIC LINER AND METHOD OF FORMING SAME

BACKGROUND

1. Technical Field

This disclosure relates generally to gas turbine engines, and more particularly to acoustic liners for gas turbine engines.

2. Background Information

Acoustic attenuation panels are known for lining the walls of nacelles of aircraft jet engines. Such acoustic structures are often referred to as acoustic liners. Generally, acoustic liners may include a cellular core covered on its exterior sides by an acoustically resistive face skin and, on the opposite side, by an acoustically reflective back skin. The face skin may include a plurality of spaced-apart holes or perforations. In this configuration, the cells of the core, covered by the face skin and the back skin, may form resonant cavities that contribute to the dissipation of incident acoustic energy by canceling acoustically reflected waves and/or converting acoustic energy into heat, such as by Helmholtz resonance.

In some acoustic liners such as, for example, low-drag acoustic liners, it may be desirable to have a very large number of small diameter holes extending through the face skin of the acoustic liner between the cells and the acoustic liner exterior. In some cases, the face skin, having the plurality of holes, may be subsequently attached to the core. However, such a process may require reticulation of the core and corresponding holes of the face skin, which may require a considerable amount of time.

Alternatively, in some cases, the face skin may be attached to the core and, subsequently, the holes of the face skin may be formed by applying a laser to the face skin so as to sequentially form each of the holes. However, formation of the holes with such a process can also be time consuming. Further, application of the laser to form the holes presents a risk of damage to other portions of the acoustic liner, such as the back skin. Accordingly, what is needed are improved systems and methods for forming holes in the face skin of an acoustic liner which address one or more of the above-noted concerns.

SUMMARY

It should be understood that any or all of the features or embodiments described herein can be used or combined in any combination with each and every other feature or embodiment described herein unless expressly noted otherwise.

According to an embodiment of the present disclosure, an acoustic liner includes a core including a plurality of cells extending between a first side of the core and a second side of the core opposite the first side of the core. The acoustic liner further includes a back skin including a light-reflecting layer. The light-reflecting layer includes a first side attached to the first side of the core. The acoustic liner further includes a face skin. The face skin includes a first side attached to the second side of the core.

In the alternative or additionally thereto, in the foregoing embodiment, the back skin further includes a structural layer bonded to a second side of the light-reflecting layer opposite the first side of the light-reflecting layer.

In the alternative or additionally thereto, in the foregoing embodiment, one or both of the structural layer and the face skin include a polymeric material.

In the alternative or additionally thereto, in the foregoing embodiment, the light-reflecting layer is an aluminum foil.

In the alternative or additionally thereto, in the foregoing embodiment, the face skin is a perforated sheet including a plurality of holes extending between the first side of the face skin and a second side of the face skin opposite the first side.

In the alternative or additionally thereto, in the foregoing embodiment, the plurality of cells of the core form a honeycomb structure.

In the alternative or additionally thereto, in the foregoing embodiment, the core is made from aluminum.

In the alternative or additionally thereto, in the foregoing embodiment, one or both of the face skin and the structural layer of the back skin include a plurality of bonded layers.

According to another embodiment of the present disclosure, a method for forming an acoustic liner includes providing a core including a plurality of cells extending between a first side of the core and a second side of the core opposite the first side of the core. The method further includes attaching a first side of a light-reflecting layer of a back skin to the first side of the core. The method further includes attaching a first side of a face skin to the second side of the core.

In the alternative or additionally thereto, in the foregoing embodiment, attaching the first side of the light-reflecting layer to the first side of the core includes bonding the first side of the light-reflecting layer to the first side of the core.

In the alternative or additionally thereto, in the foregoing embodiment, attaching the first side of the light-reflecting layer to the first side of the core includes vapor depositing the light-reflecting layer on the first side of the core.

In the alternative or additionally thereto, in the foregoing embodiment, the method further includes bonding a structural layer of the back skin to a second side of the light-reflecting layer opposite the first side of the light-reflecting layer.

In the alternative or additionally thereto, in the foregoing embodiment, the structural layer and the face skin are formed from a polymeric material.

In the alternative or additionally thereto, in the foregoing embodiment, the light-reflecting layer is an aluminum foil.

In the alternative or additionally thereto, in the foregoing embodiment, the face skin is a perforated sheet including a plurality of holes extending between the first side of the face skin and a second side of the face skin opposite the first side.

In the alternative or additionally thereto, in the foregoing embodiment, the method further includes forming the plurality of holes with a laser subsequent to attaching the first side of the face skin to the second side of the core.

In the alternative or additionally thereto, in the foregoing embodiment, the plurality of cells of the core form a honeycomb structure.

In the alternative or additionally thereto, in the foregoing embodiment, the core is made from aluminum.

In the alternative or additionally thereto, in the foregoing embodiment, one or both of the face skin and the structural layer of the back skin include a plurality of bonded layers.

According to another embodiment of the present disclosure, a gas turbine engine includes an engine core and a nacelle housing the engine core. The nacelle and the engine core define a bypass flow path therebetween. The gas turbine engine further includes an acoustic liner mounted between the nacelle and the engine core. The acoustic liner includes a liner core including a plurality of cells extending between a first side of the liner core and a second side of the liner core opposite the first side of the liner core. The acoustic liner further includes a back skin including a light-reflecting layer and a structural layer. The light-reflecting layer includes a first side bonded to the first side of the liner core and the structural layer bonded to a second side of the light-reflecting layer opposite the first side of the light-reflecting layer. The acoustic liner further includes a face skin. The face skin includes a first side bonded to the second side of the liner core. The face skin is a perforated sheet including a plurality of holes extending between the first side of the face skin and a second side of the face skin opposite the first side. The face skin defines at least a portion of the bypass flow path.

The present disclosure, and all its aspects, embodiments and advantages associated therewith will become more readily apparent in view of the detailed description provided below, including the accompanying drawings.

DETAILED DESCRIPTION

Figure 1:
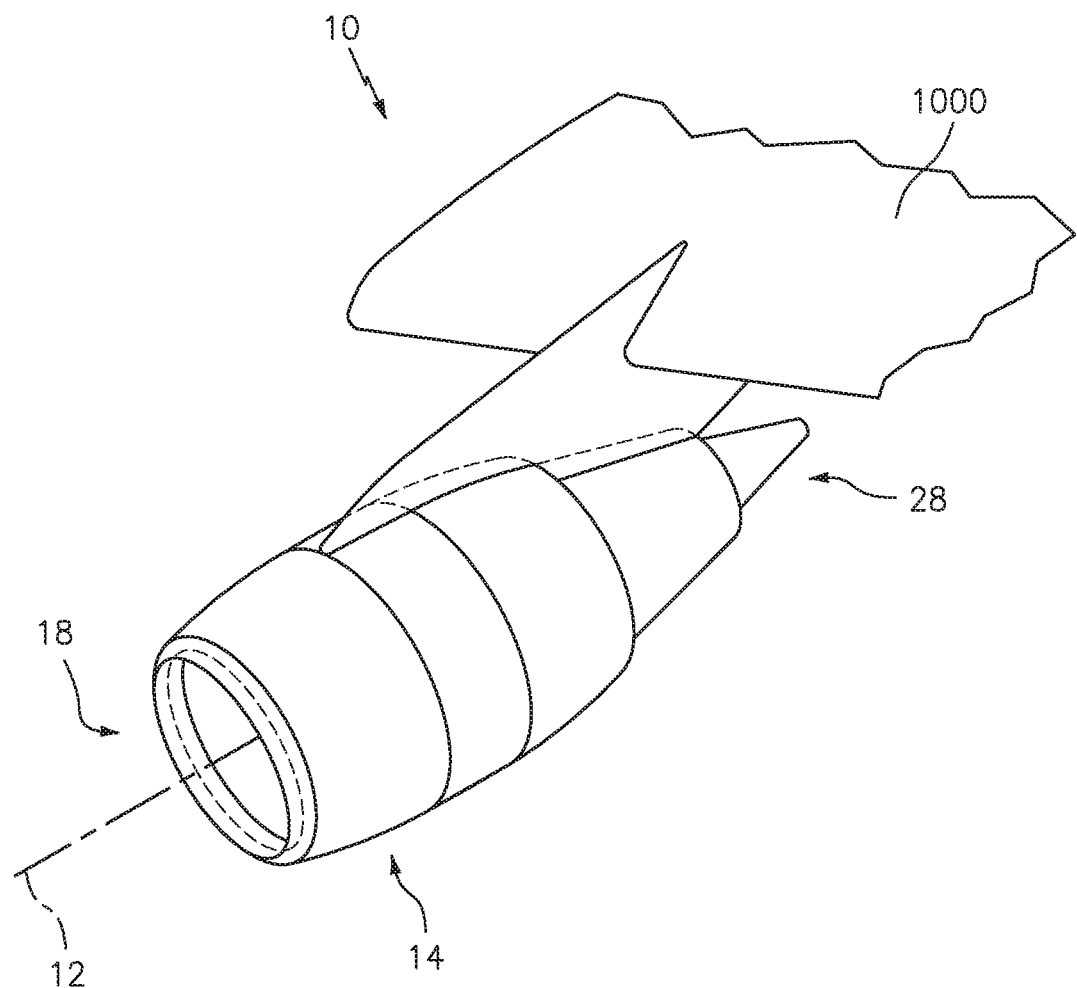
FIG. 1 illustrates a perspective view of a gas turbine engine in accordance with one or more embodiments of the present disclosure.

It is noted that various connections are set forth between elements in the following description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Figure 2:
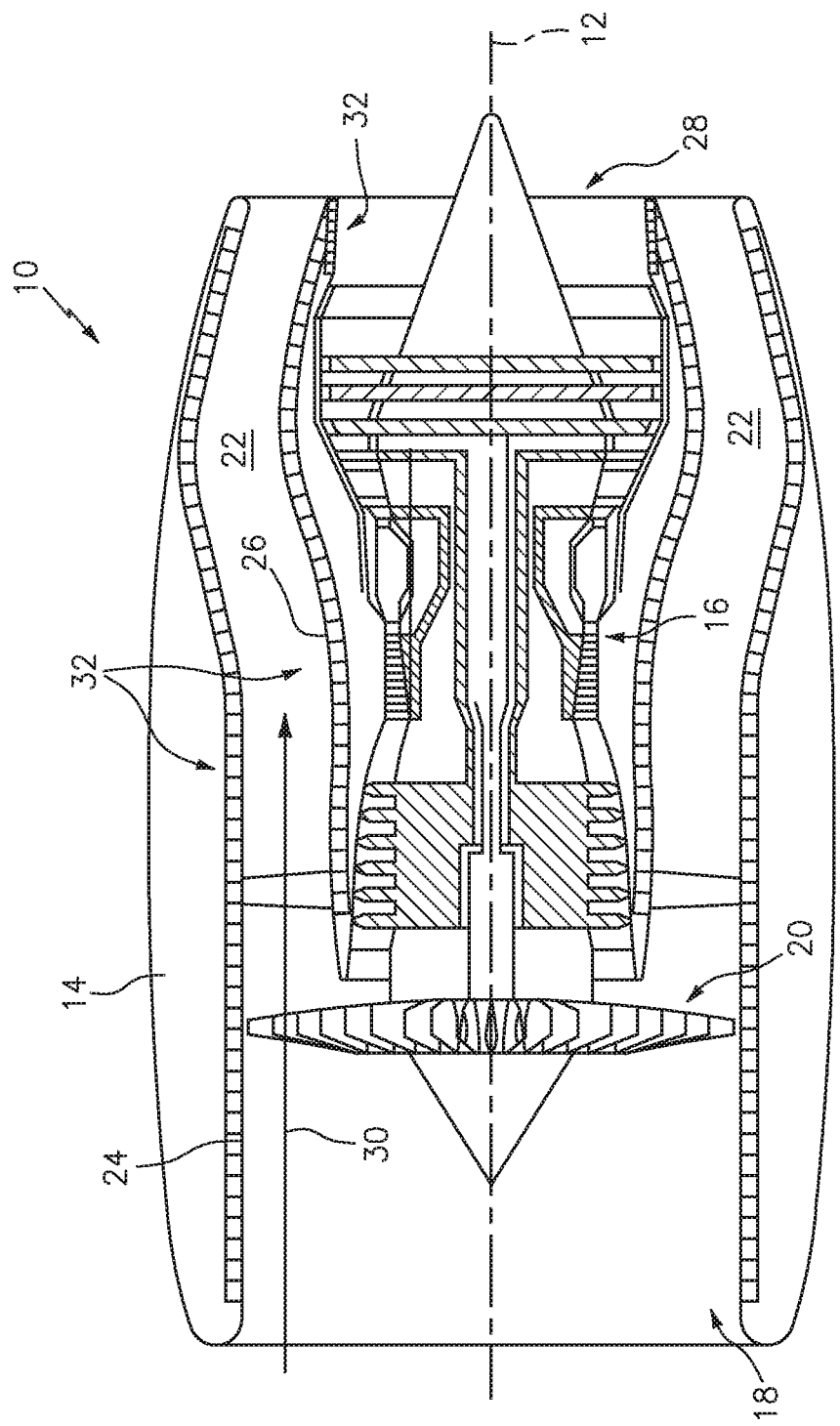
FIG. 2 illustrates a side cross-sectional view of a gas turbine engine in accordance with one or more embodiments of the present disclosure.

Referring to FIGS. 1 and 2, a gas turbine engine 10 is illustrated mounted to, for example, a wing 1000 of the aircraft. The gas turbine engine 10 is centered about a longitudinal center axis 12 and includes a nacelle 14 forming an outer perimeter of the gas turbine engine 10 and serving to generally house an engine core 16. The nacelle 14 includes an intake portion 18. A fan section 20 is disposed downstream of the intake portion 18. A bypass air duct 22 is disposed downstream of the fan section 20 and is generally defined radially between an inner wall 24 of the nacelle 14 and an outer wall 26 of the engine core 16. An exhaust nozzle 28 is located downstream of the engine core 16. At least a portion of the air entering the intake portion 18 of the nacelle 14 will pass through the fan section 20 and the bypass air duct 22 along a bypass flow path 30. In various embodiments, the nacelle 14 may include, for example, portions of a fan cowl or a thrust reverser such as, for example, a thrust reverser translating sleeve.

An acoustic liner 32 may be mounted to or may form an internal surface of the gas turbine engine 10. For example, the acoustic liner 32 may define all or a portion of a wall of the intake portion 18 of the nacelle 14, the inner and/or outer walls 24, 26, the exhaust nozzle 28, a thrust reverser, or other suitable surfaces of the gas turbine engine 10, to attenuate noise in the vicinity of the acoustic liner 32. The acoustic liner 32 may, for example, line all or a portion of the bypass flow path 30. It should be further understood that the present disclosure is not limited to use in gas turbine engines or aircraft and may be applied to any other vehicle, application, or environment where noise suppression, and particularly low frequency noise suppression, is desirable.

Figure 3:
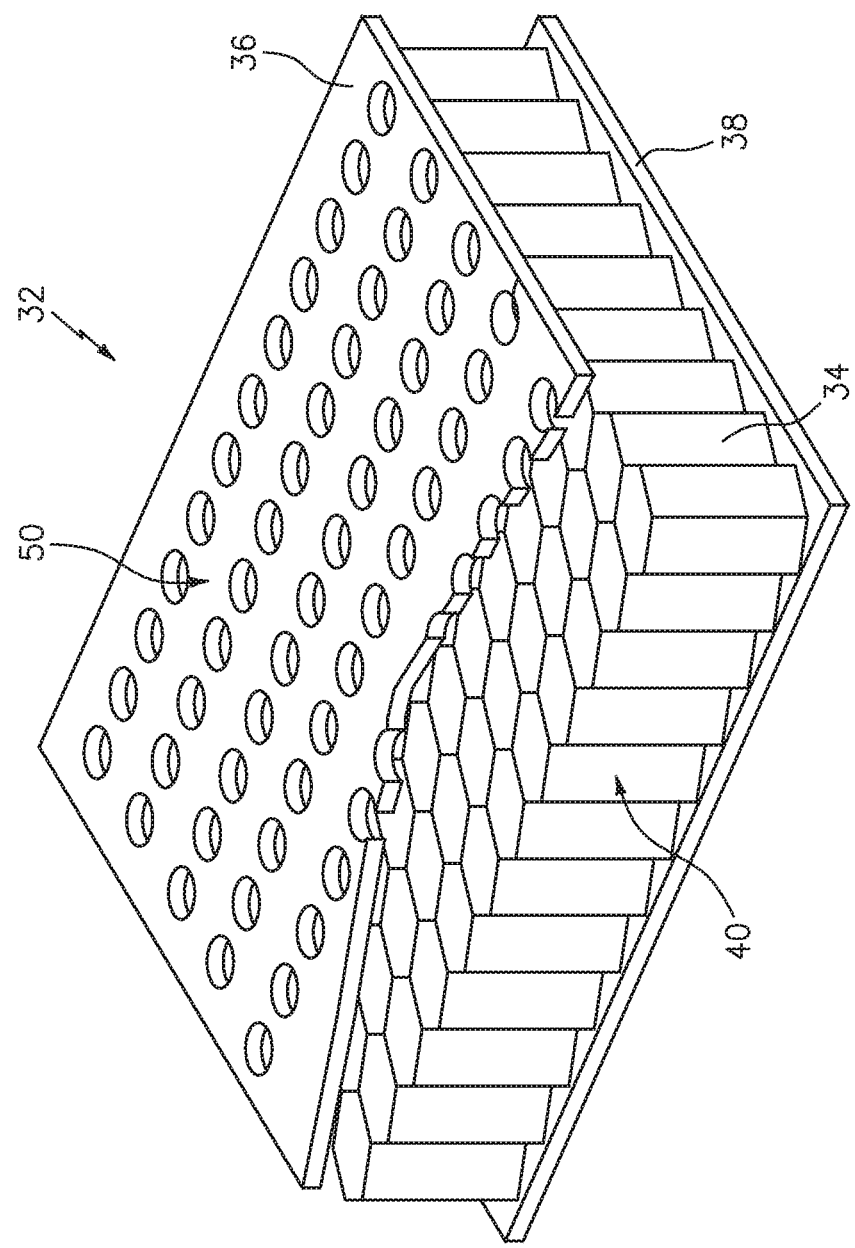
FIG. 3 illustrates a perspective cut-away view of a portion of an exemplary acoustic liner in accordance with one or more embodiments of the present disclosure.
Figure 4:
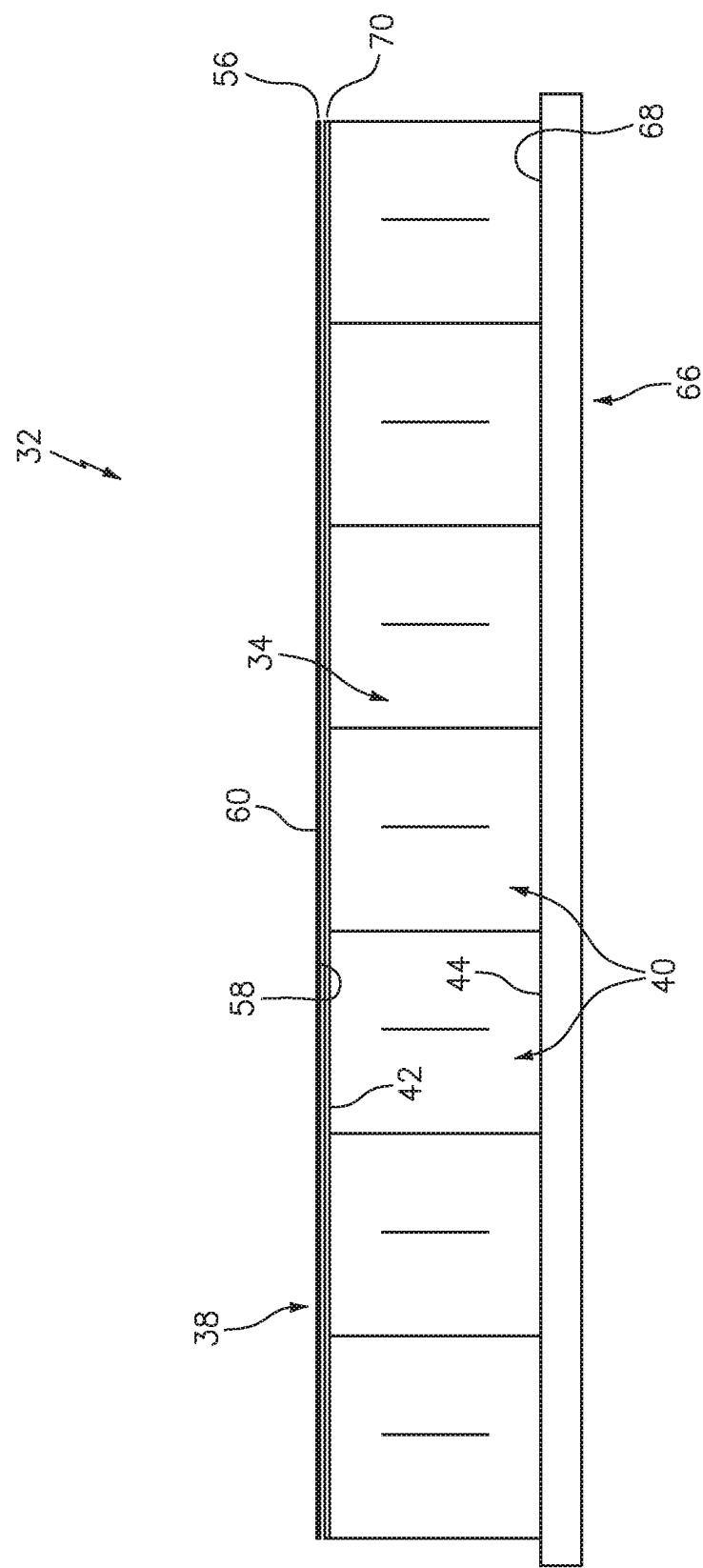
FIG. 4 illustrates a side cross-sectional view of an exemplary acoustic liner at a stage of manufacture in accordance with one or more embodiments of the present disclosure.
Figure 5:
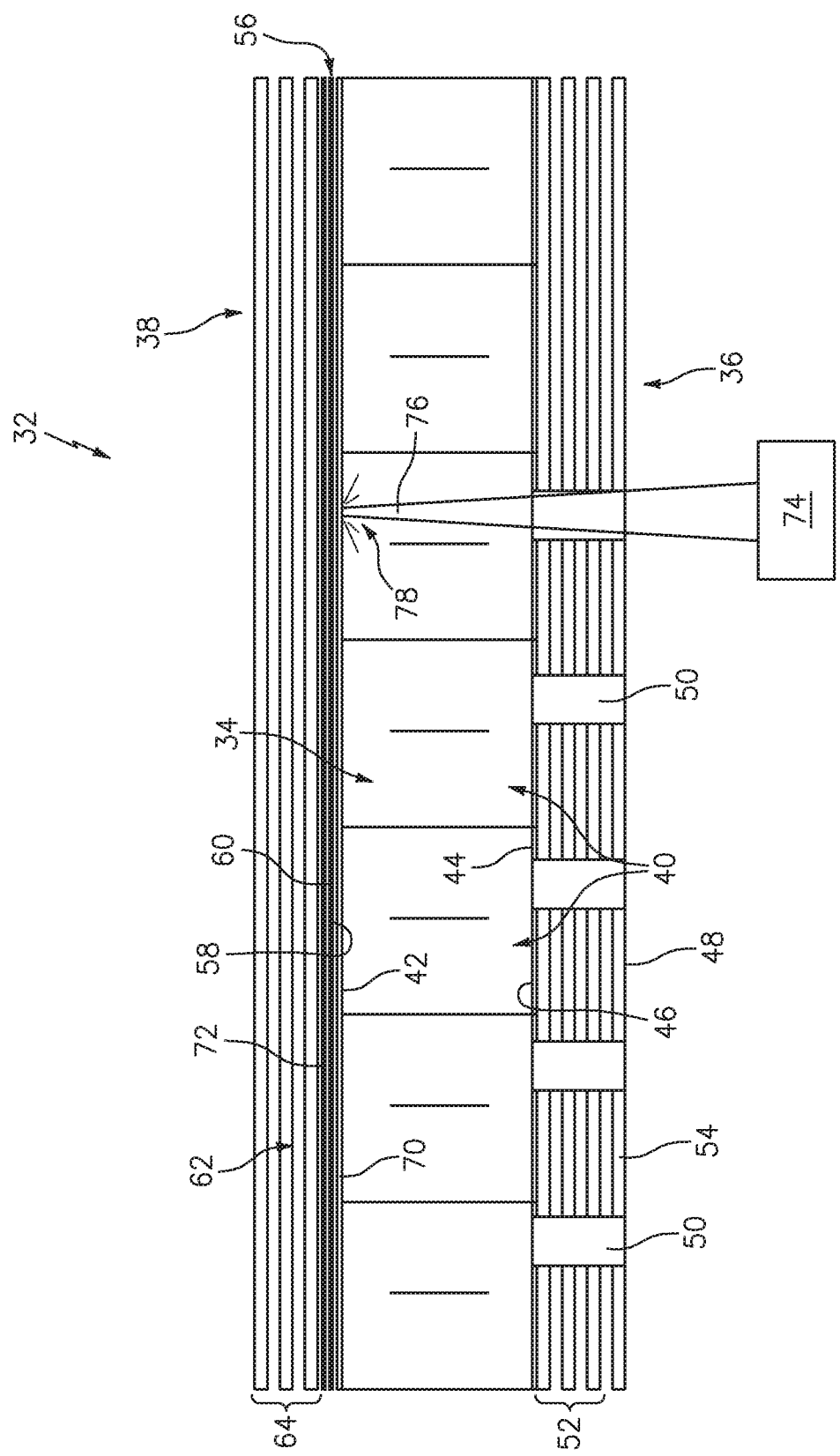
FIG. 5 illustrates a side cross-sectional view of an exemplary acoustic liner at a stage of manufacture in accordance with one or more embodiments of the present disclosure.
Figure 6:
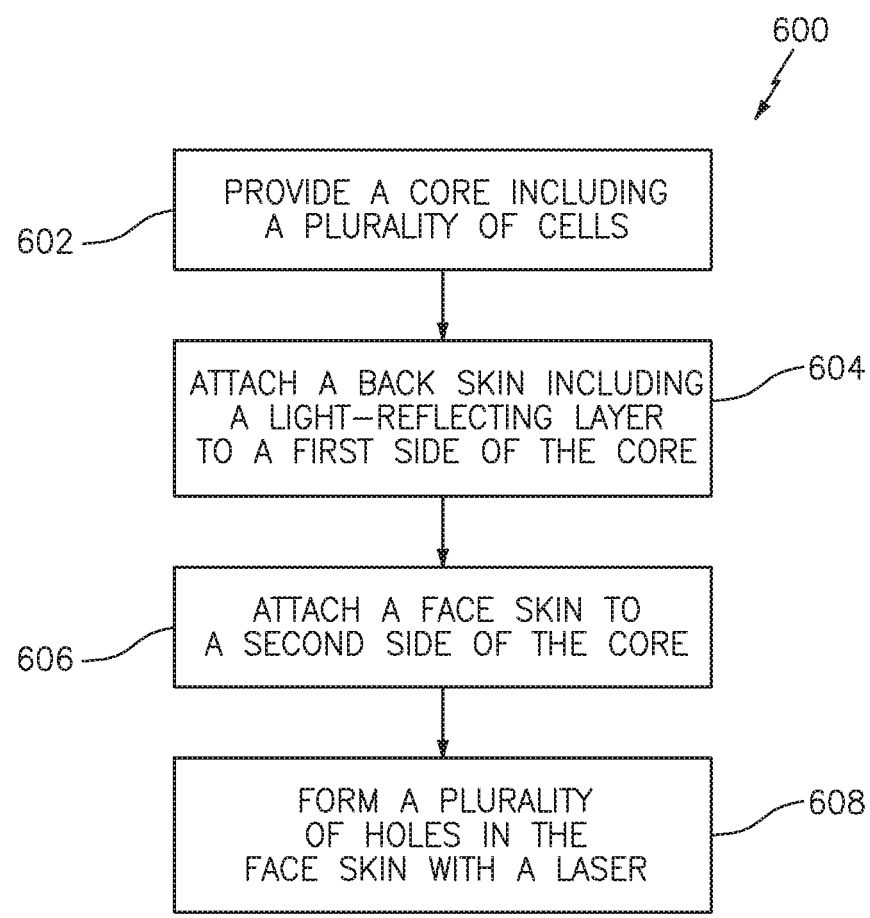
FIG. 6 illustrates a flow chart for forming an acoustic liner in accordance with one or more embodiments of the present disclosure.

Referring to FIGS. 3-5, the acoustic liner 32 generally includes a core 34 positioned between a perforated face skin 36 and a non-perforated back skin 38. The core 34 includes a plurality of cells 40 extending between a first side 42 of the core 34 and a second side 44 of the core 34 opposite the first side 42 of the core 34. The back skin 38 and the face skin 36 bound opposing ends of the plurality of cells 40 along the first side 42 and the second side 44 of the core 34, respectively. In various embodiments, the plurality of cells 40 may be configured to form a "honeycomb" structure defined by, for example, six side walls extending between the first side 42 and the second side 44 of the core 34. However, it should be understood that aspects of the present disclosure may be applied to cells having alternative configurations as well. The plurality of cells 40 of the acoustic liner 32 form resonant cavities (e.g., Helmholtz resonant cavities) that contribute to the dissipation of incident acoustic energy by attenuating acoustic reflected waves and/or converting acoustic energy into heat energy, such as by Helmholtz resonance.

The face skin 36 includes a first side 46 and a second side 48 opposite the first side 46. The first side 46 of the face skin 36 is attached to the second side 44 of the core 34. The face skin 36 includes a plurality of holes 50 extending through the face skin 36 from the first side 46 to the second side 48. Accordingly, the plurality of cells 40 of the core 34 are in fluid communication with the exterior of the acoustic liner 32 via the plurality of holes 50 extending through the face skin 36. In various embodiments, the face skin 36 may include two or more layers 52 bonded to one another (see, e.g., FIG. 5). In various embodiments, the face skin 36 may include a surfacing film 54 applied to the two or more layers 52 and defining the second side 48 of the face skin 36. The surfacing film 54 may be a nonstructural layer with a high surface tension which provides a smooth finish to the acoustic liner 32 exterior, thereby improving aerodynamic performance and cosmetic appearance of the acoustic liner 32.

The back skin 38 includes a light-reflecting layer 56 having a first side 58 attached to the first side 42 of the core 34 and a second side 60 opposite the first side 58. In various embodiments, the back skin 38 may additionally include a structural layer 62 attached (e.g., bonded) to the second side 60 of the light-reflecting layer 56. In various embodiments, the structural layer 62 may include two or more layers 64 bonded to one another (see, e.g., FIG. 5).

In operation, for example, an air stream (e.g., air flowing along the bypass flow path 30) flows across the acoustic liner 32 proximate the second side 48 of the face skin 36 in a shearing direction. Air and/or noise from this air stream generally enters each cell of the plurality of cells 40 via the plurality of holes 50 extending through the face skin 36. The plurality of cells 40 of the acoustic liner, covered by the perforated face skin 36 and the non-perforated back skin 38, form resonant cavities (e.g., Helmholtz resonant cavities) which contribute to the dissipation of incident acoustic energy by attenuating acoustic reflected waves.

Components of the acoustic liner 32, such as the structural layer 62 of the back skin 38, the face skin 36, and the core 34 may be made of a variety of materials, depending upon a particular application, including metals, composites, polymers, and ceramics. In various embodiments, for example, the structural layer 62 may be formed from a thermoset or thermoplastic material while the layers 52 of the face skin 36 may, for example, be formed from a carbon fiber reinforced polymer (CFRP). In various embodiments, components of the acoustic liner 32 may be manufactured using, at least in part, an additive manufacturing process. In various embodiments, the core 34 be made from aluminum or another suitable high-strength and lightweight material.

The light-reflecting layer 56 is formed from a material having a suitable reflectance value for reflectance of laser energy during formation of the plurality of holes 50 of the face skin 36. For example, the light-reflecting layer 56 may be formed from a "gloss" surface-finish material with greater than 50 percent reflectance. In various embodiments, for example, the light-reflecting layer 56 may be formed from a layer of aluminum foil (e.g., 5052 aluminum alloy foil) or another material possessing suitable reflectance such as, but not limited to, stainless steel. The light-reflecting layer 56 may thus provide spectral reflection of laser energy contacting the light-reflecting layer 56 which might otherwise be absorbed by the structural layer 62 of the back skin 38.

Referring to FIGS. 3-6, a method 600 for forming an acoustic liner, such as the acoustic liner 32, is provided. In Step 602, the core 34 including the plurality of cells 40 extending between the first side 42 of the core 34 and the second side 44 of the core 34, is provided. As shown in FIG. 4, for example, the core 34 (e.g., the second side 44 of the core 34) may be disposed on a co-bonding jig 66 for one or more steps of the method 600. The co-bonding jig 66 including a jig surface 68 generally corresponding to the shape (e.g., the loft) of the acoustic liner 32. Accordingly, while the jig surface 68 is illustrated as substantially flat in FIG. 4, for purposes of simplicity, the jig surface 68 may be curved or otherwise shaped, as necessary, to conform to the shape of the acoustic liner 32.

In Step 604, the back skin 38 is attached to the first side 42 of the core 34. In various embodiments, the first side 58 of the light-reflecting layer 56 may be attached to the first side 42 of the core 34 by bonding the first side 58 of the light-reflecting layer 56 to the first side 42 of the core 34 with an adhesive 70 which may be any suitable adhesive conventionally known in the art. As shown in FIG. 4, the adhesive 70 may be an unsupported adhesive. In various embodiments, the light-reflecting layer 56 may alternatively be attached to the first side 42 of the core 34 by application of a vapor deposition process. Subsequent to attaching the light-reflecting layer 56 to the first side 42 of the core 34, Step 604 further includes bonding the structural layer 62 of the back skin 38 to the second side 60 of the light-reflecting layer 56 with an adhesive 72 (e.g., a supported adhesive) which may be the same as or different than the adhesive 70.

In Step 606, the face skin 36 is attached to the second side 44 of the core 34. Similar to the back skin 38, the face skin 36 may be attached to the second side 44 of the core 34 by bonding the first side 46 of the face skin 36 to the second side 44 of the core 34 with a suitable adhesive, or by any other suitable method for attaching the core 34 and the face skin 36. In various embodiments, the Step 606 may include applying the surfacing film 54 to the second side 48 of the face skin 36.

In Step 608, the plurality of holes 50 are formed through the face skin 36 with a laser 74 such as, for example, an ultra-short pulse laser (USPL). A laser beam 76 of the laser 74 ablates the material of the face skin 36 sequentially forming each hole of the plurality of holes 50 through the face skin 36. Upon penetration of the laser beam 76 through the face skin 36, the laser beam 76 may proceed to strike (i.e., back strike) the back skin 38 of the acoustic liner 32 at a back strike location 78. A back strike is an event which occurs when, for example, laser passes through a component body or wall into an internal cavity of the component and subsequently contacts an internal wall or surface of the component, opposite the hole being drilled. In conventional acoustic liners, a back strike event could result in damage to the material of the back skin 38. The light-reflecting layer 56 of the acoustic liner 32 reflects the energy of the laser beam 76 and makes focusing of the laser beam 76 on the first side 58 of the light-reflecting layer 56 more difficult. Further, any absorbed heat, as a result of the back strike event, may be conducted rapidly across a broader area the material of the light-reflecting layer (e.g., aluminum foil), relative to the material of the structural layer 62, thereby preventing or reducing scorching of the light-reflecting layer 56 and protecting the structural layer 62 of the back skin 38 from thermal damage.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

What is claimed is:

1. An acoustic liner for a gas turbine engine, the acoustic liner comprising:
   a core comprising a plurality of cells extending between a first side of the core and a second side of the core opposite the first side of the core;
   a back skin comprising a light-reflecting layer and a structural layer, the light-reflecting layer comprising a first side and a second side, the first side of the light-reflecting layer attached to the first side of the core, the first side of the light-reflecting layer having a reflectance of greater than fifty percent, the structural layer bonded to the second side of the light-reflecting layer using an adhesive, the structural layer comprising a plurality of thermoplastic layers; and
   a face skin, the face skin comprising a first side attached to the second side of the core.

2. The acoustic liner of claim 1, wherein the face skin comprises a second polymeric material.

3. The acoustic liner of claim 2, wherein the light-reflecting layer is an aluminum foil.

4. The acoustic liner of claim 2, wherein the face skin is a perforated sheet comprising a plurality of holes extending between the first side of the face skin and a second side of the face skin opposite the first side.

5. The acoustic liner of claim 4, wherein the plurality of cells of the core form a honeycomb structure.

6. The acoustic liner of claim 4, wherein the core is made from aluminum.

7. The acoustic liner of claim 4, wherein one or both of the face skin and the structural layer of the back skin comprise a plurality of bonded layers.

8. A method for forming an acoustic liner for a gas turbine engine, the method comprising:
   providing a core comprising a plurality of cells extending between a first side of the core and a second side of the core opposite the first side of the core;
   attaching a first side of a light-reflecting layer of a back skin to the first side of the core;
   bonding a structural layer of the back skin to a second side of the light-reflecting layer opposite the first side of the light-reflecting layer, the structural layer comprising a polymeric material;
   attaching a first side of a face skin to the second side of the core; and
   forming a plurality of holes in the face sheet with a laser subsequent to attaching the first side of the light-reflecting layer to the first side of the core, bonding the structural layer to the second side of the light-reflecting layer, and attaching the first side of the face skin to the second side of the core.

9. The method of claim 8, wherein attaching the first side of the light-reflecting layer to the first side of the core comprises bonding the first side of the light-reflecting layer to the first side of the core.

10. The method of claim 8, wherein the face skin is formed from a polymeric material.

11. The method of claim 8, wherein the light-reflecting layer is an aluminum foil.

12. The method of claim 8, wherein the plurality of cells of the core form a honeycomb structure.

13. The method of claim 8, wherein the core is made from aluminum.

14. The method of claim 8, wherein one or both of the face skin and the structural layer of the back skin comprise a plurality of bonded layers.

15. The method of claim 8, wherein forming the plurality of holes with the laser includes striking the first side of the light-reflecting layer with the laser.

16. A gas turbine engine comprising:
   an engine core;
   a nacelle housing the engine core, the nacelle and the engine core defining a bypass flow path therebetween; and
   an acoustic liner mounted between the nacelle and the engine core, the acoustic liner comprising:
      a liner core comprising a plurality of cells extending between a first side of the liner core and a second side of the liner core opposite the first side of the liner core;
      a back skin comprising an aluminum light-reflecting layer and a thermoplastic structural layer, the aluminum light-reflecting layer comprising a first side bonded to the first side of the liner core and the thermoplastic structural layer bonded to a second side of the aluminum light-reflecting layer opposite the first side of the aluminum light-reflecting layer; and wherein the first side of the aluminum light-reflecting layer has a reflectance of greater than fifty percent
      a face skin, the face skin comprising a first side bonded to the second side of the liner core, wherein the face skin is a perforated sheet comprising a plurality of holes extending between the first side of the face skin and a second side of the face skin opposite the first side and wherein the face skin defines at least a portion of the bypass flow path.

* * * * *